United States Patent [19]

Fukunaga

[11] Patent Number: 5,060,019
[45] Date of Patent: Oct. 22, 1991

[54] MOUNTING STRUCTURE FOR AN ORIGINAL COVER IN AN IMAGE FORMING APPARATUS

[75] Inventor: Takehito Fukunaga, Kawasaki, Japan

[73] Assignee: Kabushiki Kaisha Toshiba, Kawasaki, Japan

[21] Appl. No.: 429,221

[22] Filed: Oct. 31, 1989

[30] Foreign Application Priority Data

Oct. 31, 1988 [JP] Japan .................. 63-275636

[51] Int. Cl.⁵ ........................................... G03G 21/00
[52] U.S. Cl. ..................................... 355/231; 355/75
[58] Field of Search .................... 355/75, 230, 231; 220/329, 339, 341; 269/289, 290; 292/303; 49/397, 402

[56] References Cited

U.S. PATENT DOCUMENTS

| | | | |
|---|---|---|---|
| 436,035 | 9/1890 | Grothaus | 292/303 |
| 3,942,630 | 3/1976 | Phillips | 220/329 |
| 4,157,222 | 5/1979 | Ishihara | 355/75 |
| 4,204,735 | 5/1980 | Opravil | 355/75 |
| 4,588,280 | 5/1986 | Ogawa et al. | 355/200 |
| 4,636,065 | 1/1987 | Kanemitsu et al. | 355/75 |
| 4,682,769 | 7/1987 | Murakami et al. | 271/10 |
| 4,926,214 | 5/1990 | Nomura et al. | 355/75 |

FOREIGN PATENT DOCUMENTS

| | | | |
|---|---|---|---|
| 0164764 | 10/1982 | Japan | 355/231 |
| 0137856 | 8/1983 | Japan . | |
| 0113441 | 5/1988 | Japan | 355/231 |

OTHER PUBLICATIONS

Ritter, "Platen Cover Hinge", Jan./Feb. 1978, Xerox Disclosure Journal, vol. 3, No. 1, pp. 69-70.

Primary Examiner—A. T. Grimley
Assistant Examiner—J. E. Barlow, Jr.
Attorney, Agent, or Firm—Foley & Lardner

[57] ABSTRACT

An image forming apparatus includes a main body having an original table on which an original set is placed, a cover mount portion located at one side of the original table, and an openable original cover having a portion to be mounted on the cover mount portion of the main body. The cover holds the original set on the table. Mounted on the cover mount portion of the main body are first to fourth engaging members, which are respectively engageable with first to fourth members to be engaged, all mounted on the cover portion to be mounted, the first and fourth members to be engaged being hooks and the second and third members to be engaged being pins. These pairs are inserted and engaged with each other when the original cover is moved in a direction perpendicular to a direction to open the cover. A pair of integral upper and lower lock projections extend from the cover mount portion of the main body and the cover portion to be mounted, respectively, and these projections are locked together when the cover is moved in the indicated perpendicular direction.

5 Claims, 6 Drawing Sheets

MOUNTING STRUCTURE FOR AN ORIGINAL COVER IN AN IMAGE FORMING APPARATUS

BACKGROUND OF THE INVENTION

1. Field of the Invention

The present invention relates to an image forming apparatus such as an electronic copying machine having an original cover and, more particularly, to an image forming apparatus having an improved mounting structure for an original cover.

2. Description of the Related Art

A conventional image forming apparatus, e.g., an electronic copying machine, includes a main body having an original table on which an original is placed and a cover mount portion located at one side, e.g., the rear side, of the original table, and an openable original cover, a portion of which is mounted, by means of hinges, on the cover mount portion, for holding in place an original set on the original table.

The hinge includes metal pieces which are fastened to both said portion of the original and the mount portion of the main body by means of a plurality of screws, thereby connecting the original cover to the main body. Fastening the metal pieces to the original cover and the main body by screws is time-consuming. Therefore, the cost of connecting the original cover to the main body is relatively high.

SUMMARY OF THE INVENTION

The first object of the present invention is to provide an image forming apparatus having fastening means of such a structure as to fasten the original cover to the main body of the apparatus, both easily and reliably, by a one-touch operation.

The second object of the invention is to provide an image forming apparatus having fastening means which can be made by molding as a one-piece component and has a structure such that the original cover can be quickly fastened to the main body of the apparatus.

The third object of this invention is to provide an image forming apparatus having a main body consisting of upper and lower units, and an original cover mounted on the upper unit, in which the original cover is prevented from slipping down from the upper unit even when the upper unit is pivoted upward, thus opening the main body for maintenance operations.

The fourth object of the invention is to provide an image forming apparatus having an original cover fastened to the main body of the apparatus by fastening means, and a stopper for preventing the cover from moving from a predetermined position and preventing the fastening means from being damaged due to the displacement of the cover.

According to the present invention, there is provided an image forming apparatus comprising a main body, an original table mounted on the top of the main body, a cover mount placed on one side of the original table, an original cover for holding an original set on the original table, and engaging and holding means for fastening the original cover to the cover mount. The engaging and holding means fastens the cover to the mount when it is moved substantially perpendicular to the direction in which the cover is rotated between its closed position and its open position and is thus inserted into the gap between the cover and the mount.

The main body of a preferred embodiment of the invention comprises an upper unit on which the original table and the cover mount are placed, and a lower unit having hinge means connected to the upper unit such that the upper unit can be swung upward through a predetermined angle, e.g., 25°. The engaging and holding means fastens the original cover to the cover mount in such a manner that the cover is prevented from slipping down when the upper unit is moved upward to open the main body.

The engaging and holding means comprises an engaging means and a stopper means. The engaging means restricts the movement and insertion of the original cover, and also the horizontal and vertical movements of the cover mount. The stopper means restricts the movement of the original cover in either direction, thus preventing the cover from slipping off the upper unit when the upper unit is moved upward.

The engaging means preferably comprises first, second, third, and fourth engaging portions. The first and fourth engaging portions respectively comprise first and fourth engaging members each having an engaging hole with one open end, the first and fourth engaging members being mounted to be spaced apart from each other at the left and right portions of the cover mount portion of the main body, and first and fourth L-shaped hooks each having a pawl inserted in and engaged with a corresponding one of the engaging holes of the first and fourth engaging members from a corresponding one of the open ends. The first and fourth hooks extend from the left and right portions of the cover portion to be mounted so as to be spaced apart from each other. The first and fourth hooks are engaged with the first and fourth engaging members, respectively, so that the movement/insertion limit of the original cover and the movement of the cover portion in the back-and-forth direction and upward direction are restricted. A plurality of support legs can be disposed on the first and fourth engaging portions, as needed, to restrict the movement of the cover portion in a downward direction when the original cover is engaged and held.

The second and third engaging portions respectively comprise second and third engaging members each having an engaging groove with one open end and an open upper portion. The second and third engaging members are mounted on the cover mount portion of the main body and located between the first and fourth engaging members, and second and third pins extending from the cover portion, located between the first and fourth hooks, and are respectively inserted in and engage the grooves of the second and third engaging members from the open ends. Such engagement restricts the movement of the original cover and the cover portion both in the back-and-forth direction and a downward direction.

The stopper means comprises a triangular lower lock projection extending from the cover mount portion of the main body and located between the second and third engaging members, and a triangular upper lock projection extending from the cover portion to be mounted and located between the second and third pins, the lower lock projection being moved over the upper lock projection and engaged with an upper end of the lower lock projection when the cover is moved and inserted. Upon locking of these upper and lower lock projections, the movement of the cover in a direction opposite to a direction to move and insert the cover is restricted, thus preventing inadvertent removal of the cover.

The original cover and the cover mount portion of the main body are preferably made of a synthetic resin. Preferably, the first to fourth engaging members and the lower lock projection are also a synthetic resin and may be integrally formed on the cover mount portion. The first hook, the second pin, the upper lock projection, the third pin, and the fourth hook are also preferably of synthetic resin and may be integrally formed on the cover portion to be mounted.

The shape of the lock projections is not limited to a specific one. However, the lower lock projection located on the main body side is preferably formed by a substantially right-triangular upward extending projection including a left inclined surface having a small inclination angle relative to the horizontal, and a right inclined surface having a large inclination angle relative to the horizontal. The upper lock projection located on the original cover may similarly be formed by a substantially right-triangular downward extending projection including a right inclined surface having an inclination angle substantially equal to that of the left inclined surface of the lower lock projection, and a left inclined surface having an inclination angle substantially equal to that of the right inclined surface of the lower lock projection.

The engaging and holding arrangement described permits the original cover to be in a direction substantially perpendicular to a direction to open/close the hinged cover, so that the cover portion to be mounted can be easily and reliably mounted on the cover mount portion of the main body in a one-touch operation. In addition, the engaging and holding means can be integrally formed with their respective cover parts. The number of parts required is decreased, thus reducing the cost for mounting the cover.

When the main body comprises the lower unit and the openable upper unit, the original cover can be reliably held at a predetermined position without removing the engaged and held original cover, so that the upper unit of the main body can be swung open to permit maintenance service of the image forming apparatus. In addition, since the movement of the original cover in a direction to remove it is restricted by the stopper means, a shift of the original cover and damage to the engaging portion due to insufficient engagement can be prevented.

DETAILED DESCRIPTION OF THE PREFERRED EMBODIMENT

An embodiment of the present invention will be described hereinafter with reference to the accompanying drawings.

Figure 2:
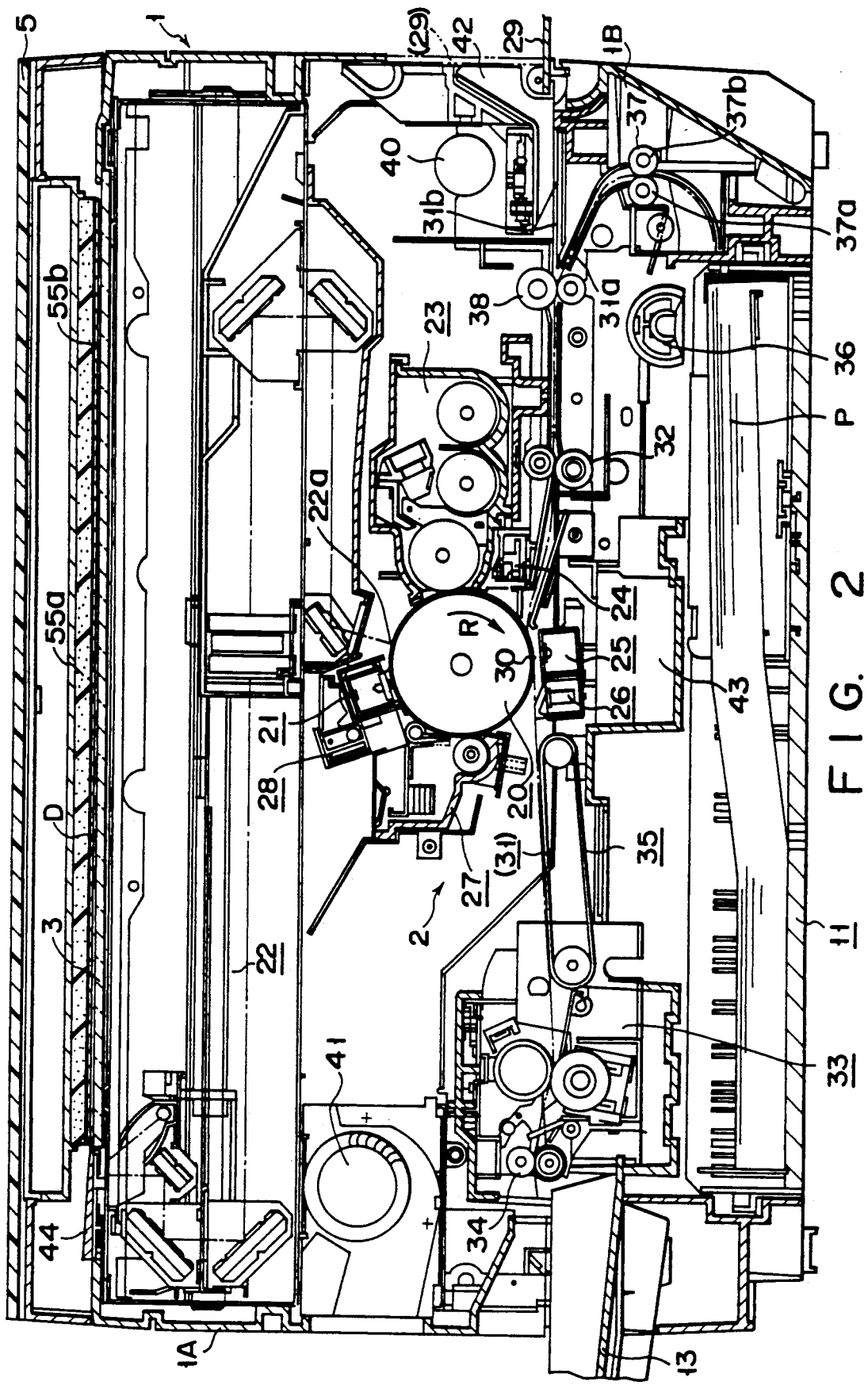
FIG. 2 is a front elevational view, partly in section, of the entire image forming apparatus.

A main body 1 of an image forming apparatus shown in FIG. 2 includes a process constituting means 2 for realizing a series of image formation processes such as charge, exposure, developing, transfer, separation, cleaning, discharge, and fixing processes. An original table (referred to as a platen glass hereinafter) 3 made of glass for supporting an original document D and a cover mount portion 4b located at one side, e.g., a rear side, of the platen glass 3 are disposed on an upper surface of the main body 1. The cover mount portion 4b is formed by a frame member of a synthetic resin serving as a rear edge of the upper surface of the main body 1.

Figure 1:
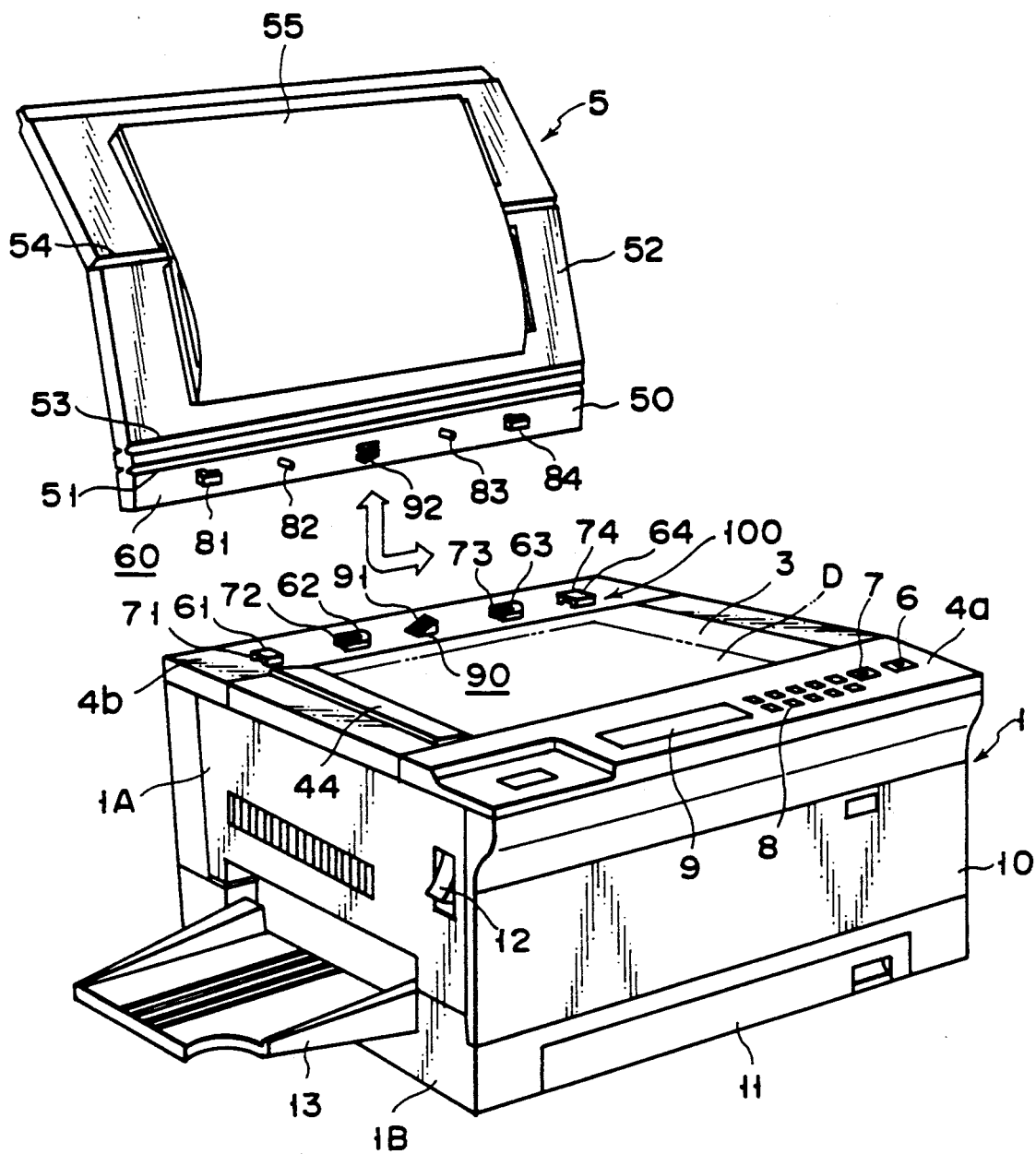
FIG. 1 is a perspective view showing an image forming apparatus according to an embodiment of the present invention in which the original cover is removed.
Figure 3:
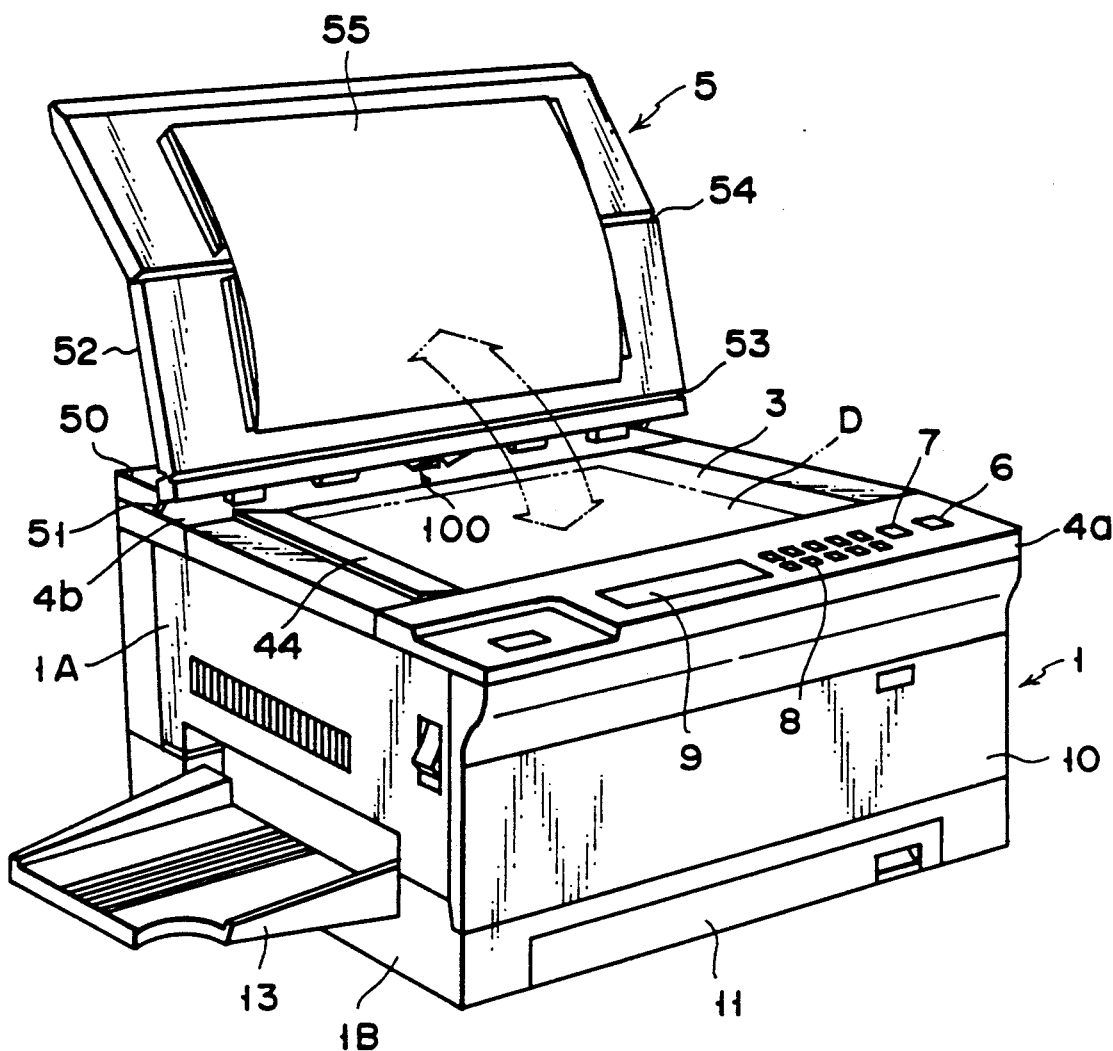
FIG. 3 is a perspective view showing the image forming apparatus with the original cover open.

An openable original cover 5 is mounted on the cover mount portion 4b of the main body 1 to hold the original D set on the platen glass 3. As shown in FIGS. 1 and 3, an operation panel 4a is arranged on the front end portion of the upper surface of the main body 1. A copy key 6, a clear/stop key 7, ten keys 8, a display 9, and the like are arranged on the operation panel 4a.

An openable front cover 10 is disposed on a front surface of the main body 1. A sheet cassette 11 insertable from the front of the main body 1 is attached to a lower portion of the main body 1. As shown in FIG. 2, sheets P such as normal paper are contained in the sheet cassette 11. Each sheet P contained in the cassette 11 is fed to the image formation process constituting means 2. A power switch 12 and a receiving tray 13 are arranged on the left side of the main body 1. The fixed sheets P delivered from the main body 1 are stacked on the receiving tray 13.

The above-mentioned process constituting means 2 has the following arrangement. A drum-like photosensitive body 20 serving as an image carrier is located at a substantially central portion in the main body 1. The photosensitive body 20 is driven and rotated in a direction indicated by an arrow R shown in FIG. 2. As shown in FIG. 2, a charger unit 21, an exposure portion 22a of an exposure unit 22, a developer unit 23, a pre-transfer exposure unit 24, a transfer charger unit 25, a separation charger unit 26, a cleaner unit 27, and a discharge unit 28 are arranged around the photosensitive body 20 along a direction of its rotation.

A sheet convey path 31 is formed in the main body 1. The sheet convey path 31 guides a sheet P automatically fed from the sheet cassette 11 or a sheet P manually fed from a manual sheet feed table 29 to the receiving tray 13 disposed on the left side of the main body 1 through an image transfer portion 30 located between the photosensitive body 20 and the transfer charger unit 25.

An aligning roller mechanism 32 is located upstream of the image transfer portion 30 along the sheet convey path 31. A fixing unit 33 and an exit roller mechanism 34 are disposed downstream of the image transfer portion 30 along the sheet convey path 31. A conveyor belt unit 35 is disposed between the separation charger unit 26 and the fixing unit 33 on the sheet convey path 31.

A sheet feed roller 36 is disposed near a space in which the sheet cassette 11 is inserted to feed the sheets P from the sheet cassette 11 one by one. The sheet P fed from the sheet cassette 11 upon rotation of the sheet feed roller 36 is conveyed to a separation/convey roller mechanism 37 having a convey roller 37a and a separation roller 37b. The conveyed sheet P is further conveyed to a first branch convey path 31a which constitutes the upstream side of the sheet convey path 31 upon rotation of the rollers 37a and 37b. A second branch convey path 31b serves as a path for the sheet P manually fed from the manual sheet feed tray 29 and merges with the first branch convey path 31a. Manual sheet feed rollers 38 are disposed at the merger point of the first and second branch convey paths 31a and 31b.

The main body 1 is divided into upper and lower units 1A and 1B with respect to the sheet convey path 31. The upper unit 1A includes the platen glass 3 on which the original D is placed, and the cover mount portion 4b located at the rear side of the platen glass 3. The upper unit 1A is pivotally supported to be openable by a pivotal supporting means 40 disposed at a sheet feed side of the lower unit 1B. The upper unit 1A of the main body can be opened upward at a predetermined angle to the horizontal, e.g., about 25°, about the pivotal supporting means 40 as a pivoting fulcrum during, e.g., maintenance service of the image forming apparatus. The upper unit 1A opens in a direction perpendicular to the direction of opening the original cover 5. The unit 1A shown in FIG. 2 is manually moved upward, pivoted in the upper right direction, and is shown open in FIG. 7. The pivotal supporting means 40 is constituted by a shaft portion of a torsion bar for always biasing the upper unit 1A in a direction to open it.

As shown in FIG. 2, a cooling fan 41 is disposed at the upper left position of the fixing unit 33. A manual feed guide 42 is disposed near the manual feed tray 29 to guide the sheet P manually fed to the branch convey path 31b. A high-voltage transformer 43 is arranged near the transfer charger unit 25 and the separation charger unit 26. As shown in FIGS. 1 and 3, a scale 44 is arranged at one side of the upper surface of the platen glass 3 to serve as a setting reference for the original D.

Figure 4:
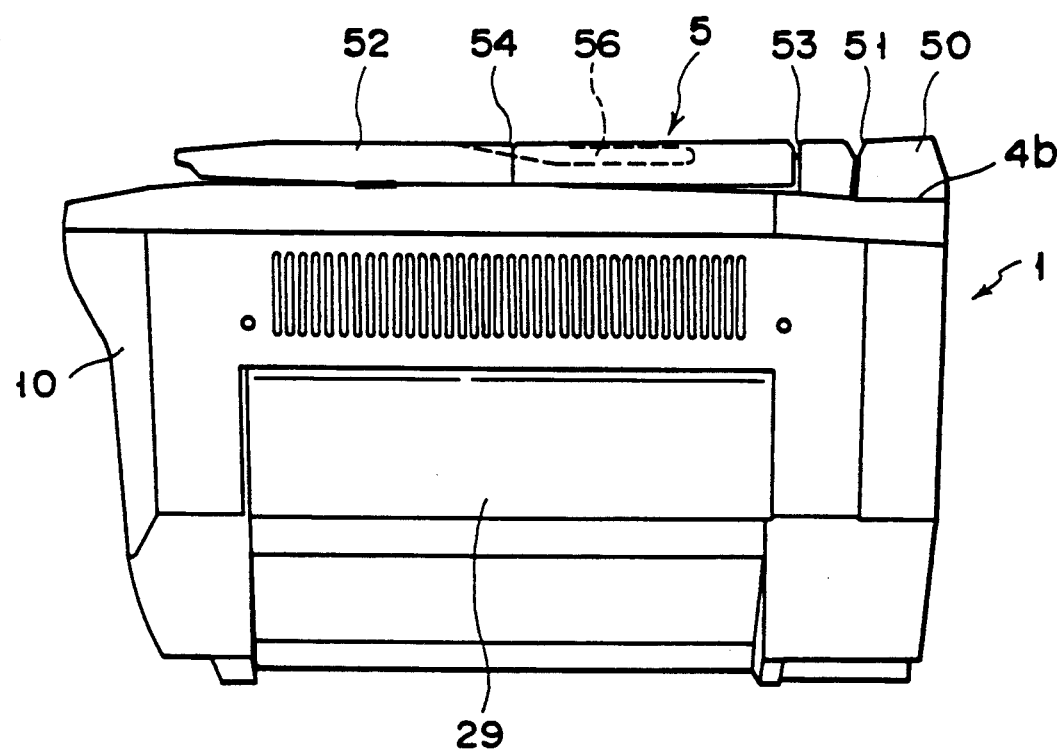
FIG. 4 is a right end view of the image forming apparatus in FIG. 3.

The above-mentioned original cover 5 is made of a flexible synthetic resin such as polypropylene. As shown in FIGS. 3 and 4, the synthetic resin cover 5 includes a portion 50 mounted on the cover mount portion 4b of the main body 1, and a cover main body 52 adapted to be hinged to the 50. A first hinge portion 51 is formed in the cover main body 52 at the joint between the body and the portion 50 to be mounted. A second hinge portion 53 is formed relatively adjacent the first hinge portion 51, and a third hinge portion 54 is located at an intermediate portion of the cover main body 52. As shown in FIG. 1, the first, second, and third hinge portions 51, 53, and 54 extend parallel to each other in a direction perpendicular to the direction in which the cover opens. The cover 5 can be manually opened so as to open the platen glass 3, as shown in FIG. 3, or closed so as to hold the original D set on the platen glass 3, as shown in FIGS. 2 and 4.

As shown in FIGS. 1 and 3, an original holding unit 55 is disposed on an inner surface of the cover main body 52 which overlaps the platen cover 3. The original holding unit 55 includes a cushion member 55a and a white platen sheet 55b for covering a surface of the cushion member 55a, as shown in FIG. 2. As shown in FIG. 4, an original pocket 56 is formed on the upper side of the cover main body 52 to temporarily contain other originals D.

Engaging and holding means 100 are formed both on the cover portion 50 and the cover mount portion 4b of the main body 1 so as to engage and hod the portion 50. The original cover 5 is moved in a direction (left to right as illustrated) perpendicular to the direction of opening the cover, so that the engaging and holding means 100 are inserted in and engaged with each other. The structure of the engaging and holding means 100 will be described hereinafter.

Figure 5:
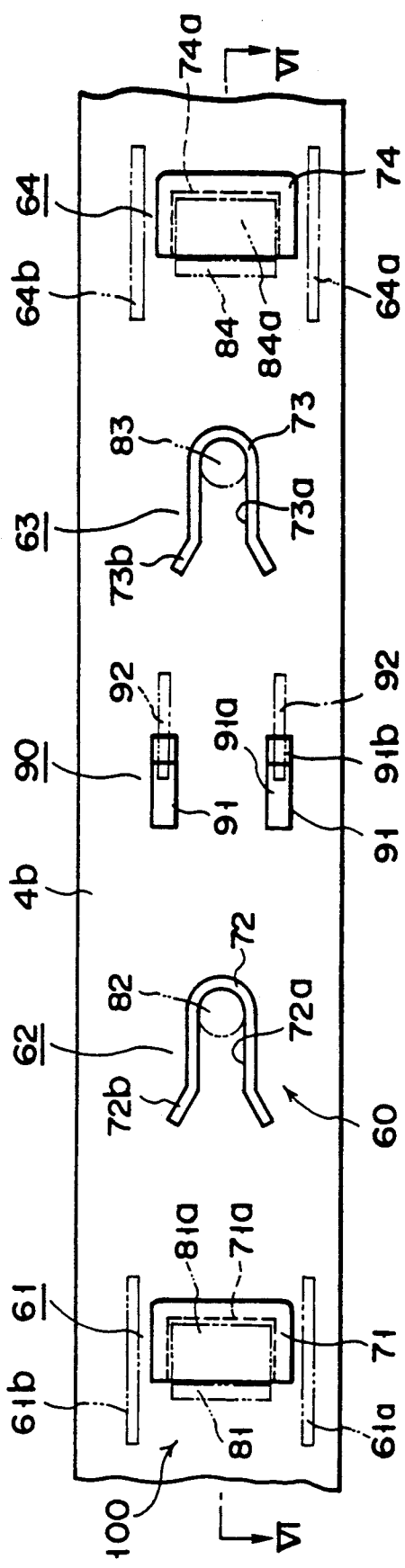
FIG. 5 is a plan view showing an arrangement of engaging and holding means for mounting the original cover on a cover mount portion of a main body.
Figure 6:
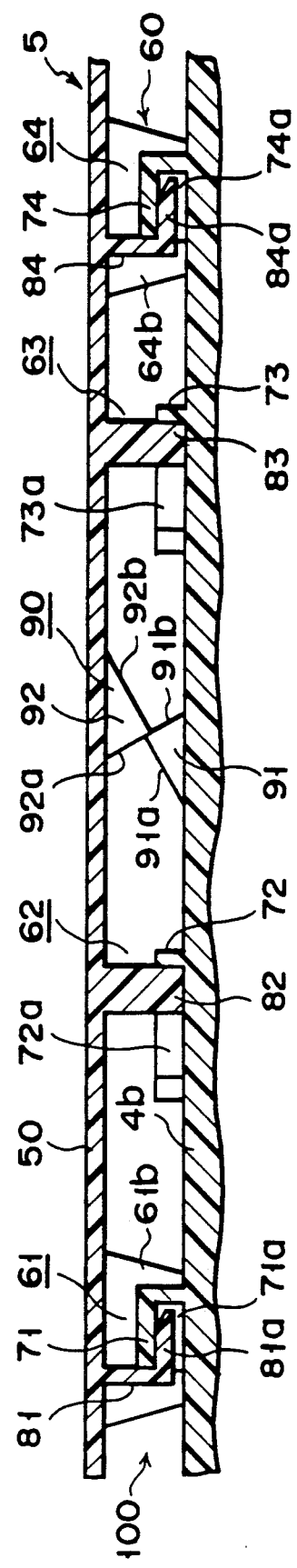
FIG. 6 is a sectional view of FIG. 5 taken along the line of VI—VI.

More specifically, referring to FIGS. 5 and 6, the engaging and holding means 100 include an engaging means 60 for restricting the movement/insertion limit of the original cover 5 and the movement of the portion 50 to be mounted in back-and-forth and vertical directions perpendicular to a direction to move and insert the cover, and a stopper means 90 for restricting the movement of the cover in a direction opposite to the direction of insertion of the cover (from the right to the left in this embodiment) to prevent removal of the cover 5 when the original cover 5 is engaged and held.

The engaging means 60 is comprised of four engaging portions, i.e., first, second, third, and fourth engaging portions 61, 62, 63, and 64. As shown in FIGS. 5 and 6, the first engaging portion 61 includes a first engaging member 71 and a first L-shaped hook 81, and the fourth engaging portion 64 includes a fourth engaging member 74 and a fourth L-shaped hook 84. The first and fourth engaging members 71 and 74 respectively include engaging holes 71a and 74a each having one open end. The engaging members 71 and 74 integrally extend from the left and right portions of the cover mount portion 4b of the main body 1 and are spaced apart from each other. (See FIG. 1) The first and fourth hooks 81 and 84 include pawls 81a and 84a, respectively. The pawls 81a and 84a are inserted in and engaged with the engaging holes 71a and 74a of the first and fourth engaging members 71 and 74 from their open ends, respectively. The first and fourth hooks 81 and 84 are spaced apart from each other at relatively opposite ends of the cover portion 50. As shown in FIGS. 5 and 6, when the first and fourth hooks 81 and 84 are respectively inserted in and engaged with the first and fourth engaging members 71 and 74, the movement of the original cover 5 and the cover portion 50 are limited both in the back-and-forth direction and an upward direction.

A plurality of plate-like support legs 61a, 61b, 64a, and 64b are mounted adjacent to the first and fourth engaging portions 61 and 64. The two pairs of legs 61a and 61b, and 64a and 64b sandwich the first and fourth engaging portions 61 and 64, respectively. These support legs 61a, 61b, 64a, and 64b restrict the movement of the cover portion 50 in a downward direction when the original cover is engaged and held. These legs are preferably integrally formed with the cover portion 50.

The second and third engaging portions 62 and 63 restrict the movement of the cover 5 and cover portion 50 in both the back-and-forth and downward directions when the original cover 5 is engaged and held. The second engaging portion 62 comprises a second engaging member 72 and a second pin 82, and the third engaging portion 63 comprises a third engaging member 73 and a third pin 83. The second and third engaging members 72 and 73 are U-shaped in pan view and have engaging grooves 72a and 73a, respectively. The members 72 and 73 are open at one end and at the top, and members 72 and 73 preferably integrally extend from the cover mount portion 4b of the main body 1. The members 72 and 73 are located between the first and fourth engaging members 71 and 74. The second and third pins 82 and 83 have diameters large enough to be inserted in the open ends of and are engaged with the engaging grooves 72a and 73a of the second and third engaging members 72 and 73, respectively. The second and third pins 82 and 83 preferably integrally extend from the cover portion 50 and are located between the first and fourth hooks 81 and 84. As shown in FIG. 5, the open ends of the second and third engaging members 72 and 73 diverge outwardly to form guides 72b and 73b for the pins 82 and 83, respectively.

The above-mentioned stopper means 90 includes two pair of lower and upper lock projections 91 and 92 each having a triangular shape. The lower lock projections 91 are located between the second and third engaging members 72 and 73 and integrally extend from the cover mount portion 4b of the main body 1. The upper lock projections 92 are located between the second and third pins 82 and 83, and integrally extend from the cover portion 50. As shown in FIG. 6, when the cover 5 is moved and inserted, the upper lock projections 92 move over the lower lock projections 91 and are engaged with the upper ends of the lower lock projections 91, respectively.

Each lower lock projection 91 is a substantially right-triangular, upwardly extending projection having an inclined surface 91a inclined at a small inclination angle, and a right inclined surface 91b inclined at a large inclination angle with respect to the insertion of the cover. As shown in FIG. 5, the two upward extending projections 91 are spaced apart from each other to receive therebetween a cover insertion axis of the cover mount portion 4b of the main body. Each upper lock projection 92 similarly comprises a substantially right-triangular, downwardly extending projection having a right inclined surface 92b inclined at an inclination angle substantially equal to that of the left inclined surface 91a of the lower lock projection 91, and a left inclined surface 92a inclined at an inclination angle substantially equal to that of the right inclined surface 91b of the lower lock projection 91. As shown in FIG. 5, the two downwardly extending projections 92 are spaced apart from each other to receive therebetween a cover insertion axis of the cover portion 50 in order to engage with the pair of the upward extending projections 91.

The right inclined surface 91b of the lower lock projection 91 and the left inclined surface 92a of the upper lock projection 92 abut against each other in an abutment amount and at an angle such that when the original cover 5 is removed by being moved to the left, it is strongly kept upward. For example, the abutment amount (engaging size) of the upper end portion of the right inclined surface 91b of the lower lock projection 91 and the lower end portion of the left inclined surface 92a of the upper lock projection 92 is set to fall within the range of about 2 mm to 3 mm. The inclined surfaces 91a and 92b which abut against each other when the cover is mounted are inclined at a relatively small angle, e.g., about 30° with respect to the upper surface of the cover mount portion 4b of the main body and to the lower surface of the cover portion 50. The inclined surfaces described permit the upper lock projections 92 to easily move over the upper end portions of the lower lock projections 91 using a small force.

The first to fourth engaging members 71 to 74 and the lower lock projections 91 are of a suitably synthetic resin and integrally formed on the cover mount portion 4b. The first hook 81, the second pin 82, the upper lock projection 92, the third pin 83, and the fourth hook 84 are of as suitable synthetic resin and integrally formed on the cover portion 50.

When the original cover 5 is moved to the right as shown in FIG. 1, the cover portion 50 can be easily mounted on the cover mount portion 4b of the main body 1 by the engaging and holding means 100 having the above arrangement in a one-touch operation.

As shown in FIGS. 3 and 4, since the direction to open the original cover 5 is perpendicular to a direction to remove it, a force is not exerted in a direction to remove the cover 5 when the cover 5 is swung open and closed along the hinge axis. Therefore, no problem occurs during the opening/closing operation of the cover.

Figure 7:
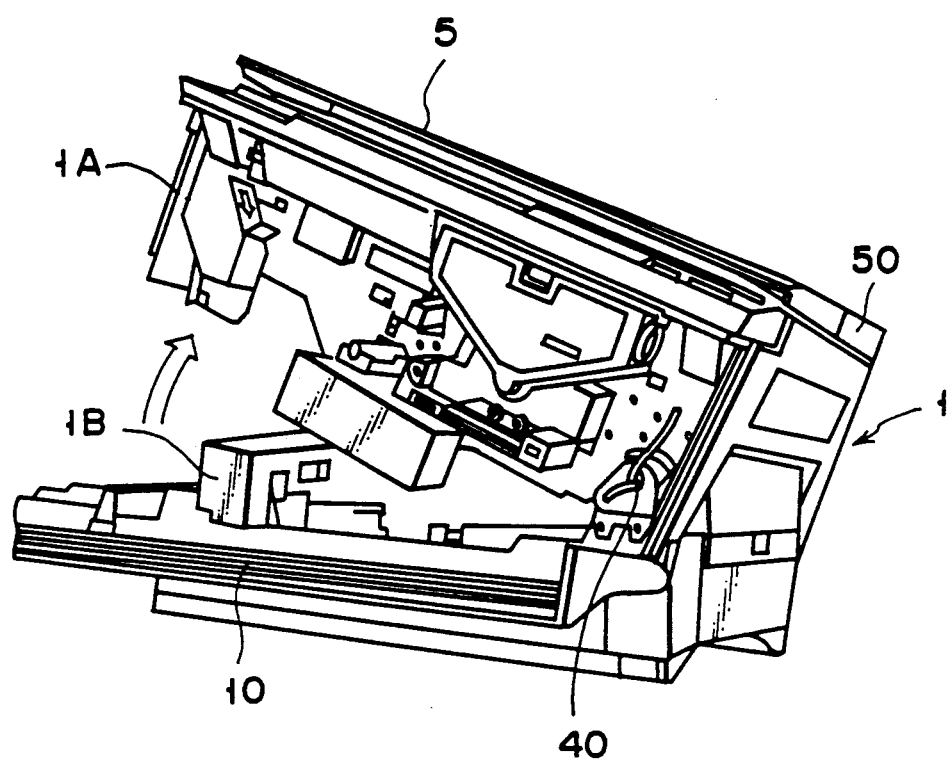
FIG. 7 is a perspective view of the image forming apparatus in which its upper unit is open.

Since the original cover 5 cannot be removed to the right, the cover 5 can be reliably kept in its mounted position if the upper unit 1A of the main body is open since the right side of the upper unit 1A serves as a lower end of inclination, as shown in FIG. 7. When the cover is mounted, the movement of the cover in a direction to remove it is restricted by the stopper means 90. Therefore, even if a force is exerted in a direction to remove the cover for any reasons, the cover 5 is not displaced or removed. When the original cover 5 is removed, as needed, the cover portion 50 of the original cover 5 is manually and slightly moved upward to release or unlock the lower and upper lock projections 91 and 92. The cover 5 is moved to the left to a disengaged state, so that the cover can be easily removed.

What is claimed is:
1. An image forming apparatus comprising:
a main body including an upper and lower portion hinged together at respective one ends thereof to assume an openable and closable clamshell configuration, the main body further including an original table on which an original is placed, and a cover mount portion located at one side of said original table on the upper portion of the apparatus;
a removable original cover for holding in place the original placed on said original table, said cover having a mounting portion adapted to be removably mounted on said cover mount portion; and
engaging and holding means disposed on both said mounting portion and said cover mount portion, said engaging and holding means being so constructed and arranged that they are engaged with each other by moving said original cover in a first direction, substantially orthogonal to the direction of opening and closing of said original cover, such engagement securing said original cover to said main body, and said original cover is easily detached from said main body by moving said original cover in a second direction, opposite to said first direction;
said engaging and holding means comprising:
engaging means for restricting the degree of movement of said cover in a back-and-forth direction and a vertical direction perpendicular thereto when said original cover is engaged and held;
stopper means for restricting movement of said cover when said original cover is engaged and held;
first, second, third and fourth engaging portions, said first and fourth engaging portions respectively comprising first and fourth engaging members each having an engaging hole with one open end and being mounted being spaced apart from each other at the left and right portions of said cover mount portion of said main body, and first and fourth L-shaped hooks each having a pawl inserted in and engaged with a corresponding one of said engaging holes of said first and fourth engaging members from a corresponding one of said open ends, said first and fourth hooks extending from left and right portions of said mounting portion of said cover and being spaced apart from each other, so that the movement/insertion limit of said original cover and the movement of said mounting portion of said cover in the back-and-forth direction and an upward direction are restricted when said first and fourth hooks are inserted in and engaged with said first and fourth engaging members respectively; and said second and third engaging portions respectively comprising second and third engaging members each having an engaging groove with one open end and an open upper portion, said second and third engaging members being mounted on said cover mount portion of said main body and located between said first and fourth engaging members, and second and third pins extending from said cover portion to be mounted and located between first and fourth hooks, and respectively inserted in and engaged with said engaging grooves of said second and third engaging members from said open ends, so as to restrict the movement/insertion limit of said original cover and the movement of said mounting portion in the back-and-forth direction and a downward direction when said second and third pins are inserted and engaged with said second and third engaging members, respectively; and said stopper means comprising a triangular lower lock projection extending from said cover mount portion of said main body and located between said second and third engaging members, and a triangular upper lock projection extending form said mounting portion of said cover and located between said second and third pins, said upper lock projection being moved over said lower lock projection and engaged with an upper end of said lower lock projection when said cover is moved and inserted.

2. An apparatus according to claim 1, wherein said main body comprises an upper unit having said original table and said cover mount portion, and a lower unit having means for pivotally supporting said upper unit to open said upper unit to a predetermined angle in a direction perpendicular to the direction in which said cover is opened and closed, said engaging and holding means engaging and holding said mounting portion of said original cover with said cover mount portion when said upper unit is open.

3. An apparatus according to claim 1, wherein said first and fourth engaging portions comprise a plurality of support legs for restricting the movement of said mounting portion of said original cover in a downward direction when said original cover is engaged and held.

4. An apparatus according to claim 1, wherein said original cover and said cover mount portion of said main body are made of a synthetic resin, said first to fourth engaging members and said lower lock projection are made of resin and integrally formed with said cover mount portion, and said first hook, said second pin, said upper lock projection, said third pin, and said fourth hook are made of resin and integrally formed on said mounting portion of said cover.

5. An apparatus according to claim 1, wherein said lower lock projection is formed by a substantially right-triangular upward extending projection including a left inclined surface having a small inclination angle and a right inclined surface having a large inclination angle with respect to the horizontal, and wherein said upper lock projection is formed by a substantially right-triangular downward extending projection including a right inclined surface having an inclination angle substantially equal to that of said left inclined surface of said lower lock projection and a left inclined surface having an inclination angle substantially equal to that of said right inclined surface of said lower lock projection.

* * * * *